United States Patent
Breuer et al.

(10) Patent No.: US 12,250,635 B2
(45) Date of Patent: Mar. 11, 2025

(54) METHOD FOR POWER EFFICIENT DATA TRANSMISSION

(71) Applicant: Telit Cinterion Deutschland GmbH, Munich (DE)

(72) Inventors: Volker Breuer, Boetzow (DE); Florian Denzin, Berlin (DE)

(73) Assignee: Telit Cinterion Deutschland GmbH, Munich (DE)

( * ) Notice: Subject to any disclaimer, the term of this patent is extended or adjusted under 35 U.S.C. 154(b) by 447 days.

(21) Appl. No.: 17/783,093

(22) PCT Filed: Dec. 8, 2020

(86) PCT No.: PCT/EP2020/084977
§ 371 (c)(1),
(2) Date: Jun. 7, 2022

(87) PCT Pub. No.: WO2021/116056
PCT Pub. Date: Jun. 17, 2021

(65) Prior Publication Data
US 2023/0014097 A1   Jan. 19, 2023

(30) Foreign Application Priority Data
Dec. 9, 2019   (EP) ..................... 19214520

(51) Int. Cl.
*H04W 52/02*   (2009.01)
(52) U.S. Cl.
CPC ... *H04W 52/0251* (2013.01); *H04W 52/0225* (2013.01)
(58) Field of Classification Search
CPC ........... H04W 52/0251; H04W 52/0225
See application file for complete search history.

(56) References Cited

U.S. PATENT DOCUMENTS

2007/0091836 A1*  4/2007  Oprescu-Surcobe ..................... H04W 52/0261
                                                                     455/69
2009/0227278 A1*  9/2009  Cho ...................... H04L 1/0026
                                                                     455/522

(Continued)

FOREIGN PATENT DOCUMENTS

EP   2670069 A1   12/2013

OTHER PUBLICATIONS

International Search Report (PCT/ISA/210) and Written Opinion (PCT/ISA/237) mailed on Feb. 11, 2021 by the European Patent Office as the International Searching Authority for International Application No. PCT/EP2020/084977—[10 pages].

*Primary Examiner* — Rafael Perez-Gutierrez
*Assistant Examiner* — Gilbert M Grant
(74) *Attorney, Agent, or Firm* — PEARL COHEN ZEDEK LATZER BARATZ LLP

(57) ABSTRACT

Provided is a method for data transmission from a user equipment to a remote server by means of a base station of a cellular network, wherein the user equipment is configured to carry out payload data transmission to said remote server. It comprises: carrying out a first signaling data transmission to the base station, determining a first power value representative of the power spent for said first signaling data transmission, maintaining the first power value as reference value, carrying out a second signaling data transmission to the base station, and determining a second power value representative of the power spent for said second signaling data transmission. In case said second power value exceeds said first power value by a predetermined threshold value, it delays the next payload data transmission for a predetermined time.

15 Claims, 3 Drawing Sheets

(56) References Cited

U.S. PATENT DOCUMENTS

2015/0173073 A1  6/2015  Lindoff et al.
2018/0249419 A1* 8/2018  Zhang .................. H04L 5/0055

* cited by examiner

METHOD FOR POWER EFFICIENT DATA TRANSMISSION

CROSS-REFERENCE TO RELATED APPLICATIONS

This application is a National Phase Application of PCT International Application No. PCT/EP2020/084977, International Filing Date Dec. 8, 2020, claiming priority to European Patent Application No. 19214520.9, filed Dec. 9, 2019, which is hereby incorporated by reference.

FIELD OF THE INVENTION

The present invention relates to a method for a user equipment for data transmission. The invention also pertains to a user equipment using said method.

BACKGROUND OF THE INVENTION

Generally, in the field of wireless communication for machine type devices resp. IoT (Internet of Things) it is known that user equipments are operating under tight power consumption requirements. Typically an IoT device operated in the field is powered by a battery which potentially has to last for many years. This is only possible by reducing the amount of radio signal reception and transmission compared to regular mobile handsets like smartphones.

First approaches are already defined in the standardization of 4G (Long Term Evaluation LTE) resp. 5G (New radio NR) for lower-category devices operating in sub-standards like CAT-M and CAT-NB-IoT. Such approaches comprise an enhanced discontinuous reception cycle (eDRX) of up to 24 h or the power saving mode (PSM), which allows a deep sleep of the user equipment for a defined time.

However after a certain time the user equipment needs to indicate to the cellular network that it is still operative, in order to avoid that the cellular network, where the user equipment is operating in, marks the user equipment as switched off, when it does not send any type of signals.

This is an approach which in particular applies to such IoT devices that are rarely sending small amounts of data to a remote device or server, and do not expect incoming calls. They are expected to send once in a period of time, like a day, a measured value, where for the receiving party it plays no big role, if the data transmission is carried out at a certain point in time, as long as e.g. once a day the measured value gets transmitted. This type of communication is called non-momentary.

However, with the approaches that are available like PSM it may happen, that after a measured value for transmission is pending, that in the next occasion when a PSM phase ends, that data transmission conditions are that bad, that a transmission of the measured value would consume much more power than calculated per data transmission. This is in particular the case when the user equipment is operating in enhanced coverage mode, e.g. when stationary installed in the basement of a house in bad coverage conditions, which are overcome by repetitions of identical radio transmissions, until the receiving base station can accumulate sufficient power for decoding the signals. Such repetitions might in bad conditions go up to a number of 1000.

Obviously all approaches for saving power at the user equipment with PSM or eDRX are cannibalized, when at the scheduled point of data transmission the radio conditions are that bad, which might be temporary e.g. through a truck parking in front of the house in line sight to the serving base station, or other disturbances.

Therefore it requires more elaborate approaches for the user equipment to control the power consumption in non-momentary data transmission to overcome the mentioned problem.

It is therefore the goal of present invention to propose a solution for an improved power-consumption aware scheme of non-momentary data transmissions from a user equipment to a remote server.

Further alternative and advantageous solutions would, accordingly, be desirable in the art.

SUMMARY OF THE INVENTION

For this it is according to a first aspect of the invention suggested a method to operate a user equipment according to claim 1. It is further suggested according to a second aspect of the invention a user equipment according to claim 9.

According to the first aspect of the invention it is proposed a method for data transmission from a user equipment to a remote server by means of a base station of a cellular network, wherein the user equipment is configured to carry out payload data transmission to said remote server, the method comprising the steps of:

carrying out a first signaling data transmission to the base station, determining a first power value representative of the power spent for said first signaling data transmission, maintaining the first power value as reference value, carrying out a second signaling data transmission to the base station, determining a second power value representative of the power spent for said second signaling data transmission, in case said second power value exceeds said first power value by a predetermined threshold value, delaying the next payload data transmission for a predetermined time.

The invention relates to user equipments operating in a cellular network, comprising a plurality of base stations. The user equipment is operating with the cellular network by means of one of the base stations, hereinafter the serving base station. The user equipment is in particular configured to carry out payload data transmissions to a remote server, connectively coupled to the cellular network, in particular over the internet.

The user equipment and base station resp. cellular network implement in particular the technology standards of 4G (LTE) and/or 5G (New Radio NR) and beyond.

Preferably such payload data transmissions relate to data acquired by the user equipment. This is in particular the case for metering device, which in particular carry out the payload transmissions regularly, that means following a schedule. Furthermore it needs to be noted that the traffic of such devices is in most cases delay tolerant, means the exact time when the transmission or reception takes place is not that important unless the transfer is executed within a certain time. Downlink (DL) traffic needs to wait when applying eDRX and PSM unless the user equipment is listening or again interacting with the cellular network and uplink (UL) traffic is preferably executed at these points not interrupting the sleep period. However, when to exactly carry out the data transmission is not determined.

Hence for the remote server and/or the user equipment it is not important that the data are transmitted at the very time which is following the schedule, but within a certain period.

Preferably, as it is the case for metering devices, the user equipment is operating stationary, that means is not spatially moving in the cell area, but is e.g. rather fixed on a wall.

Such user equipments are in particular operating with a tight power budget, typically due to being operated with batteries, which are supposed to last for a defined period, in particular for several years.

For doing so an optimization of the energy situation is necessary, and was already defined in the standard, like applying PSM, eDRX and other mechanisms.

Problem is that, preferably for user equipments operating in enhanced coverage mode, the data transmission conditions might at the time of the scheduled data transmission be so bad that it requires a remarkable amount of power for submitting such payload data. This might be the case e.g. due to an obstacle in the path direction to the serving base station, like a parking truck or the like.

As a matter of fact, before carrying out such rare data transmission the user equipment has no idea of the data transmission conditions for UL signalling. Furthermore considering downlink signals from the base station would not be reliable enough, in particular when operating in narrowband technologies like NB-IoT or Cat-M (which are designed for user equipments like metering devices), due to the fact that fading is by nature frequency selective, and an accurate deriving of the required power level for a data transmission is on pure downlink measurements not accurately possible.

Hence it requires a more elaborate approach which ensures an power consumption-aware transmission of payload data of a user equipment also in case of bad radio conditions.

This is where the invention comes into play. Generally, the approach of the inventive method is to delay the payload traffic, as long as this is possible. This is for delay-uncritical data transmission no problem, while a solution for the problem needs to consider, that a data transmission cannot be delayed perennially.

The inventive solution therefore suggests a new way of identifying if a delay is needed. For this the user equipment according to the first aspect of the invention carries out a first signaling data transmission to the serving base station. Unlike payload data transmission signaling data transmission is a transmission only between the user equipment and the base station which is supposed to facilitate the communication link between the base station and the camping user equipment.

One in particular preferable signaling data transmission is the so-called tracking-area update (TAU). It has the goal to inform on a regular basis the base station about that it is still operating on the base station, resp. for the cellular network in which tracking area it is currently operation. It is important first, that the cellular network knows, that the user equipment is still operative, and second where it could be paged in case of incoming calls (even if this is unlikely for metering devices). The cellular network, in particular MME resp. AMF, define for TAUs a given time between to TAU messages, like in the range of roughly around an hour.

In addition when doing TAU and DL data would be awaiting in the MME, the MME could start delivering them straight away, as said DL data is rather unlikely but in rare cases this may occur.

The TAU is carried out by means of a RACH request, wherein the energy for an RACH request is ramped up, based on open loop power measurements, until the base station sends a response. Then the user equipment knows with which power the TAU message is transmitted.

As it is the case for TAU messages, for the respective signaling data transmission it is advantageous when all such signaling data transmission have the same size. Thus they are comparable.

Alternatively or additionally the RACH messaging may be considered as signaling data transmission. This applies in particular to the RACH transmissions in preparation of a TAU. Depending upon the radio conditions the RACH procedure until the base station responds also relates to signaled data of similar size, which could give an indication about the power needed for a payload data transmission.

As part of the invention method it is for the first signaling data transmission determined a first power value, which represents the power which was spent by the user equipment for carrying out said first signaling data transmission. As this might change due to the signaling conditions, means how high it was needed to power up the transceiver in order to reach the base station, the first power value is locally stored as a reference value for the next steps. Such storing is either in the volatile or permanent memory of the user equipment. Preferably it is suggested according to an advantageous embodiment of the invention that after the step of determining a first power value the step of activating a power saving mode at the user equipment, and deactivating said power saving mode before the step of carrying out the second signaling data transmission.

This embodiment comprises that the user equipment activates the PSM mode between two signaling data transmission, in particular between two TAU messages.

Through the TAU message the user equipment can additionally request a maximum time that the PSM may last. Preferably the user equipment gets a response which takes into account the expected time between two TAU messages.

With this embodiment a further power consumption optimization is achieved, as the user equipment can switch off its transceiver and thus lead to a very low power consumption over the time.

Between the first and second signaling additional TAUs may be signaled.

When then a second signaling data transmission to the base station is carried out by the user equipment, then it is proposed according to the inventive method to determine a second power value which represents the power spent for said second signaling data transmission.

Due to the fact that the TAU messages are identical, in particular when the user equipment is not moving, then the first and second power value are comparable.

On this observation the inventive method takes advantage and proposes a comparison of the reference power value and the second power value.

When the user equipment has a data package to be transmitted as payload, which is delay tolerant, this comparison can be used for deciding if the data transmission would be with an acceptable amount of power, or exceed the envisages power budget for such regular payload data transmissions.

Therefore it is evaluated if the second power value exceeds the reference power value by a predetermined threshold.

Such predetermined threshold may be in absolute units, a percentage value or a combination thereof. If the predetermined threshold is exceeded, then the payload data transmission is delayed by a predetermined time.

Such predetermined time might be a fixed time, or a time which is derived from a standard-defined timer.

According to an exemplifying embodiment it is proposed that the delay for the next payload data transmission lasts at least after conducting a third signaling data transmission to the base station.

With this embodiment it is proposed that the delay is at least lasting until the next TAU is carried out, which in particular means after conducting another PSM phase. This is fully sufficient e.g. for a payload data transmission that shall happen once a day, and with a ~1 hour PSM duration the payload data transmissions may be delayed for a couple of times until better traffic conditions are met.

In that case preferably the reference power value is kept until the data transmission is successfully carried out.

Otherwise if the second power value would be used as reference value—which was found as representing too bad traffic conditions—then with a third TAU leading to a third power value equaling the second power value, then the payload data transmission would happen under conditions that were previously found as too power consuming.

Further it is suggested in another embodiment that the delay lasts shorter than the next power saving mode is activated.

This variant suggests that the delay is only for a few seconds or minutes after the PSM is activated again. This is preferably for short time delays, e.g. when data are to be transmitted hourly. A momentary disturbance of the radio link to the base station can be avoided by this embodiment.

This is in particular advantageous when the application part of the user equipment has additional knowledge or overrules the proposal of the user equipments communication unit. As no check can be made if the traffic conditions got better after the TAU, it would be not sure if a payload data transmission that is delayed by a few seconds or minutes would be done with a better power consumption.

Due to the fact that fading and coupling loss can also vary over time hence an early decision after having the TAU signaling whether data are sent or not is preferable.

When RACH ramping leads to an early response from the base station compared to earlier attempts, the mode of Early Data Transmission (EDT) is applied, which means that the data packet is transmitted in combination with the TAU update, that means in the third message of the TAU update message flow, as defined in the standard.

In case that RACH ramping does not lead to a success the user equipment can also change its CE-class means the number of repetitions to be performed. When determining that a lower CE class than at previous attempts is available the UE will also carry out the data transfer.

The general approach of this inventive method is in particular advantageous as not only the power for carrying out uplink data transmission is considered, rather than downlink signal measurements or so, and moreover the reference value also is derived from the actual conditions around. That means when a user equipment is operating as a metering device in the basement of a house, which leads to enhanced coverage operation, then it is to expect that each payload data transmission requires more power than when installed outside on plain sight to the base station tower. Nonetheless this is supposed to be the reference for a situation which is seen as "good radio conditions". When even these conditions get worse, then the delay can be applied, in order to avoid investing too much energy in a on data packet payload data transmission.

According to another preferred embodiment it is proposed the step of amending the predetermined threshold value considering at least one out of the group:

carrying out said payload data transmission,
delaying said payload data transmission.

With this embodiment it is proposed a first amendment of the parameter for the data transmission. The first parameter is the predetermined threshold value.

It is proposed to amend this value considering the decision if the payload data transmission was carried out. If it was delayed, at least for a couple of time, then preferably the predetermined threshold is increased. This leads to the situation that for the next attempt a higher power value for the second signaling data transmission could be acceptable than before.

In particular when considering a maximum delay tolerance value, indicating how often a delay would be possible, it might be advantageous to avoid to reach this maximum delay tolerance value and carry out the data transmission regardless of the radio conditions, while with this embodiment still even if not optimal conditions then at least acceptable conditions are present when the payload data transmission is carried out.

Vice versa if the payload data transmission is carried out, in particular after a delay, then the predetermined threshold value may be reduced again.

With this embodiment a fine grained tuning of the inventive procedure can be applied which leads to a further optimization of the data transmission behavior of the user equipment.

In another preferred embodiment it is proposed the step of amending the reference power value considering at least two determined power values indicative of the power spend for said signaling data transmission.

This embodiment relates to the reference power value. To improve the relevance of the reference power value, it is proposed to consider at least two power values, which are in particular determined by TAUs that were carried out.

In particular at least two successive TAUs are considered for the reference power value to achieve an average power value.

Preferably a fixed amount of successive TAUs are considered in order to achieve a moving average power value.

This embodiment improves relevance of the reference value by reducing the impact of singular events that influence the power value for submitting a signaling data transmission in the either or the other direction. Hence a more reliable reference power value is achieved which improves the behavior of the user equipment towards conducting only delays, where necessary, and not to carry out payload data transmissions when the radio conditions are too bad.

In another preferred embodiment it is suggested that the user equipment is further maintaining a maximum delay tolerance value,
wherein the method comprises the step of carrying out the next payload data transmission in case the expired delay exceeds the maximum delay tolerance value.

With this embodiment it is covered the situation of ongoing bad radio conditions, that lead to the situation, that based on the comparison of reference power value and second power value, or any power value for following signaling data transmissions, like TAUs, repeatedly it is decided to delay the payload data transmission.

Even for delay tolerant data transmission this is only acceptable in a certain range. So it is suggested that the user equipment maintains a maximum delay tolerance value, which indicates how long or how often a delay may happen. E.g. for a user equipment which is expected by its remote server to send once a day a measurement result, then with a PSM of ~1 hour up to 24 times a delay may happen, depending upon when the scheduled data transmissions time was set.

When this threshold value is reached, then according to this embodiment the payload data transmission needs to be carried out, even though a delay decision would be made based on the comparison of reference power value and the latest determined second power value for the last TAU message.

This embodiment assures that the user equipment behaves in line with the expected data transmission requirements, but may lead to a knowingly bad power consumption for this data transmission.

In order to keep the number of occurrence of this exceptional situation low, it is advantageous to apply counter measures beforehand. Hence it is suggested in another preferred embodiment the step of amending at least one out of the group of:
- the delay tolerance value,
- the predetermined threshold value, and
- power saving mode duration, in case the payload data transmission is carried out due to exceeding the maximum delay tolerance.

With that embodiment it is possible to amend the parameter of the inventive method in response to reaching the maximum delay tolerance value.

With any of the parameter it is tried to achieve the situation that good radio conditions are met rather than sending the payload data due to the reached maximum delay tolerance value.

Hence if possible the maximum delay tolerance value might be increased. This requires that this is in line with the requirements of the remote server the user equipment is sending the payload data to.

Alternatively the predetermined threshold value is amended. Preferably it is reduced. That could lead to the situation that before reaching the maximum delay tolerance value, where the radio conditions could be worse than ever, that a not good but acceptable situation, and consequently power consumption, for carrying out the payload data transmission, is detected.

Finally the power saving mode duration might be amended. There are two options: With an increase the power consumption over the time is reduced, and could by that compensate more power consumed for the payload data transmission.

With a reduction it is possible to find better radio situation, when this is frequently changing, in particular regularly.

Preferably with the power saving mode duration adaption it is also amended the delay tolerance value, in particular when it relates to the mere number the number of delays.

According to the second aspect of the invention it is proposed User equipment for data transmission to a remote server by means of a base station of a cellular network, wherein the user equipment is configured regularly carrying out payload data transmission to said remote server, further configured to:
- carry out a first signaling data transmission to the base station,
- determine a first power value representative of the power spent for said first signaling data transmission,
- maintaining the first power value as reference power value,
- carry out a second signaling data transmission to the base station,
- determine a second power value representative of the power spent for said second signaling data transmission,
- in case said second power value exceeds said reference power value by a predetermined threshold value, delay the next payload data transmission for a predetermined time.

This aspect of the invention relates to a user equipment for operating in a cellular network. It is implementing at least one of the technology standard 4G, 5G or beyond.

It in particular comprises of a communication unit, like a wireless module, that performs all communication with the serving base station of the cellular network, and an application part, which controls the communication unit, and/or the user interface and other tasks of the user equipment.

In particular it is an IoT device, e.g. a metering device for measuring power consumption of a house connection, and transmitting to a remote server via cellular communication. Such data transmission are in particular delay-tolerant, means non-momentary. That means the remote server does not require to have the measurement information when they are available, but in a defined time window.

The user equipment, in particular the communication unit, further comprises transmitting and receiving circuitry, typically a transceiver, which is connected to at least one antenna.

It further comprises processing circuitry for executing protocol stack software for controlling the transceiver and assuring that the protocol as defined in the technology standard protocol is followed.

Additionally the user equipment comprises volatile and/or permanent memory for storing the protocol stack software, as well as configuration data, like the predetermined threshold value, and other parameter of the payload data transmission procedure.

Typically the user equipment is operating stationary, which means in particular that it is fixed installed. This installation is e.g. for metering devices often done in the basement of the house.

The second aspect of the invention shares the advantages of the first aspect of the invention.

As it is shown this invention advantageously solves the depicted problem and offers a solution for assuring a power consumption aware payload data transmission scheme in particular for non-momentary data.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a user equipment 1 of the type to which the present invention is applied as an embodiment. It is capable of operating with a base station 2 of a cellular network, supporting the technology standard of 4G, 5G or beyond.

Figure 1:
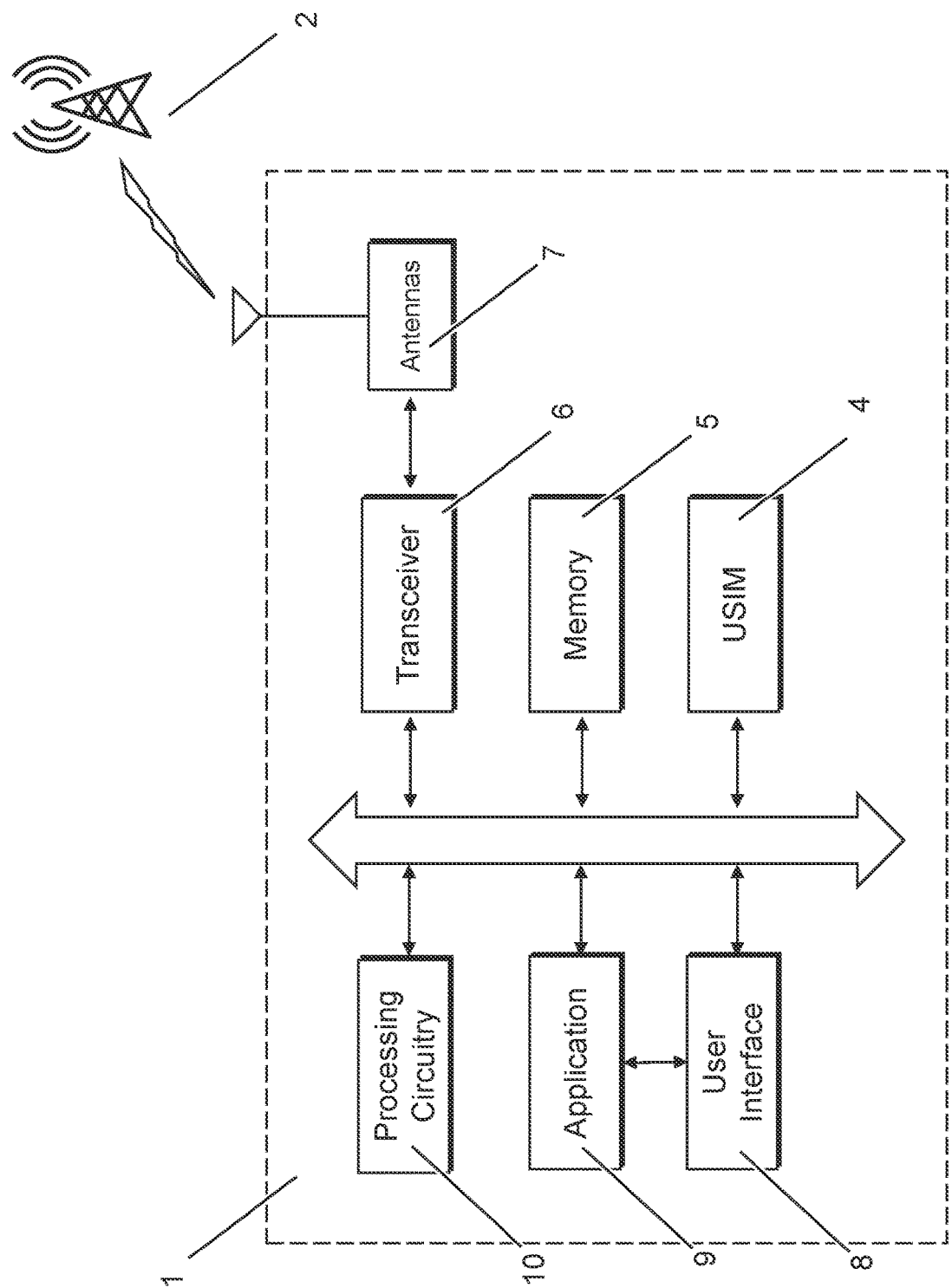
FIG. 1 represents a user equipment of the type to which the present invention is applied as an embodiment.

The user equipment is in particular an IoT device, like a metering device measuring the consumed current. Hence the user equipment 1 is composed from an application part 9, coupled with a user interface 8, and a communication part. The communication part in particular comprises processing circuitry 10, like a central processing unit (CPU). Depending upon the architecture of the user equipment 1 one processing circuitry for the application (application processor) and one for the communication unit (baseband processor) is available, or the same processing circuitry is shared for both tasks.

Preferably the user equipment 1 comprises a battery or other power supply. The user equipment 1 needs to comply with a power budget for the regular operations in order to achieve a given lifetime of the battery without recharging. The user equipment, resp. the communication unit further comprises a transceiver 6, which incorporates transmitting and receiving circuitry, which combines all hardware components that are needed for carrying out radio frequency (RF) tasks towards the base station 2. For fulfilling this task the transceiver 6 is coupled to the at least one antenna 7. As preferably the user equipment is operating in narrowband modes, normally one antenna should be sufficient, which is also advantageous for power saving reasons.

Additionally the exemplifying user equipment 1 comprises memory 5, both permanent and volatile, for storing protocol stack software, and potentially any other type of software needed by the communication unit and/or application part 9.

Finally an USIM 4 for storing the access credentials for getting access to the cellular network of the base station 2 is communicatively coupled to the user equipment 1. This is in particular a removable USIM (or UICC etc.), but also soldered variants are a possible option for this type of user equipment.

Figure 2:
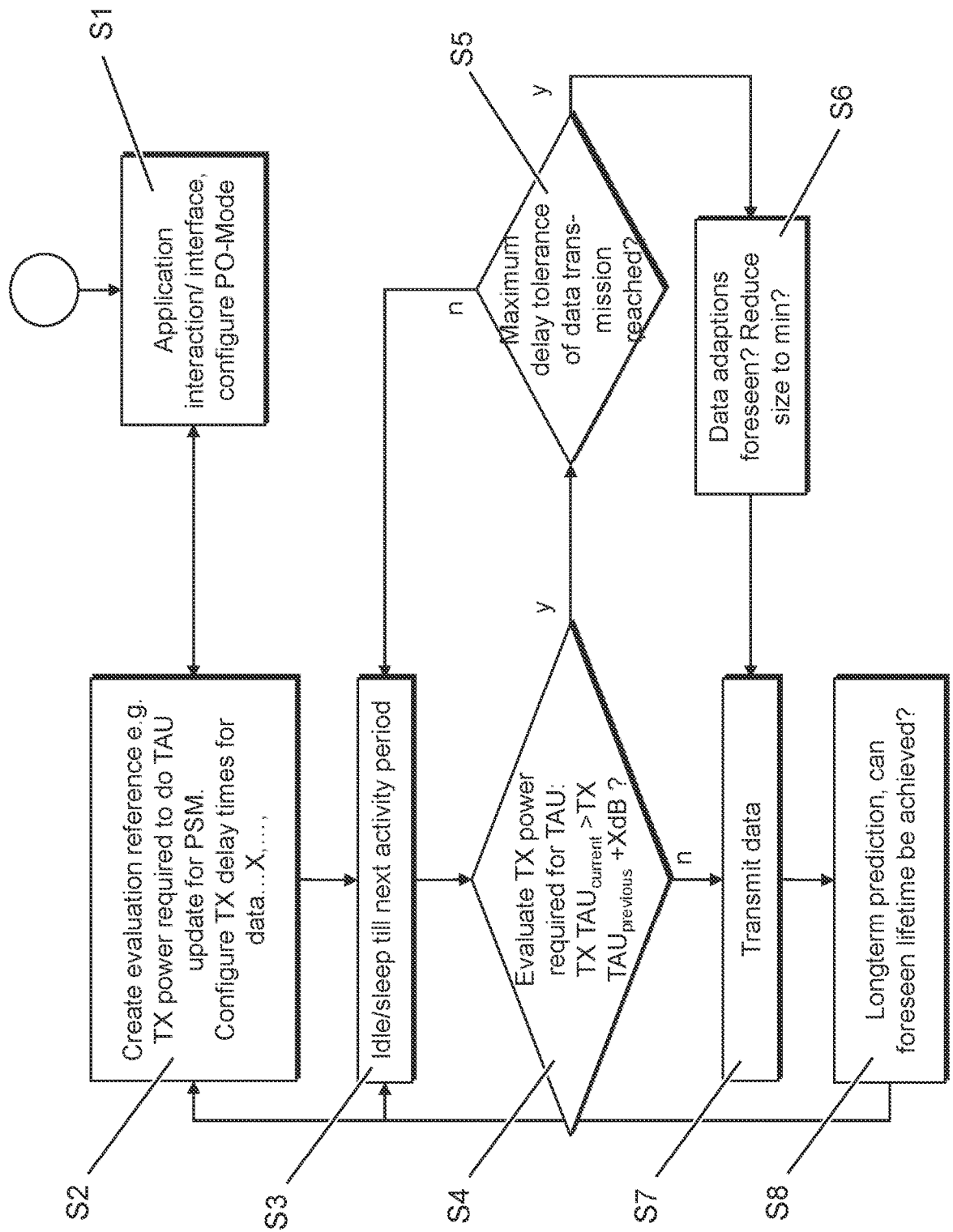
FIG. 2 shows a flow chart depicting an exemplifying embodiment of present invention.

In FIG. 2 it is shown a flow chart for an exemplifying embodiment of the proposed inventive method.

It starts in step S1 with the initialisation step, where the application 9 of the user equipment 1 activates—in particular by means of user interface 8 interaction—the PO (power optimized) mode, which is basically incorporated by the inventive method.

Then the process flow continues in step S2, where the user equipment, in particular the communication unit sets the initial values for the parameter governing the execution of the PO mode.

This comprises in particular an initial reference power value representing the TX power needed for carrying out a TAU request. This reference power value is in particular preset by carrying out a TAU request and determining the TX power value spent for this TAU.

Further delay times etc. are set in step S2.

After the TAU was carried out, the user equipment is running for a defined period of time in a power reduced mode in step S3. This might be an idle mode, but preferably it is a sleep mode like the PSM (power saving mode), as it is defined in the technology standard for LTE Cat-M etc.

During this time a data packet for payload transmission is made available by the application 9 to the communication unit of the user equipment 1.

The PSM lasts for a certain time, in particular requested in conjunction with the TAU request from step S3.

When this period expired the process flow jumps to step S4. In this step the user equipment is awaken and carries out a second TAU request, and again measures the TX power for this second TAU request. The first (previous) and second (current) TX power values for the respective TAUs are compared.

The process floor branches to Step S5 or S7 in dependence of this comparison. If the second TX power value is higher by a predetermined threshold value of X dB then the transmission of the data packet shall be delayed, and the process flow jumps to step S5.

If this is not the case, that means the both TX power values have roughly the same value, then the process flow branches to step S7.

In step S5 it is however first checked if the maximum delay tolerance value for delayed data transmission is reached. For this a preferably counter is maintained, which is increased when a delay is carried out.

Alternatively the maximum delay tolerance is measured in time e.g. since last successful payload data transmission. For that no timer is needed.

As this is the first time of delay, the process flow branches back to step S3 and the user equipment 1 activates another idle/PSM phase. The reference power value remains the same. Further the counter for delays, if needed, is increased.

Should however the maximum delay tolerance be exceeded, then the process flow branches to step S6. Here possible adaptation of the parameter of the flow are foreseen, e.g. the predetermined threshold value xDB, the maximum delay tolerance or the PSM duration.

Afterwards the process flow branches to step S7 and carries out the payload data transmission to the remote server via the base station 2.

In an optional step S8 it is then checked, in particular based on the required TX power for the data transmission, if the expected lifetime of the battery can be achieved when the currently happening amount of TX power is needed for TAU and payload data transmission. If not, further parameter amendments or an indication to the application, so that the operator gets informed through the user interface and may take appropriate steps to act in time, that means long time before the battery is empty.

Figure 3:
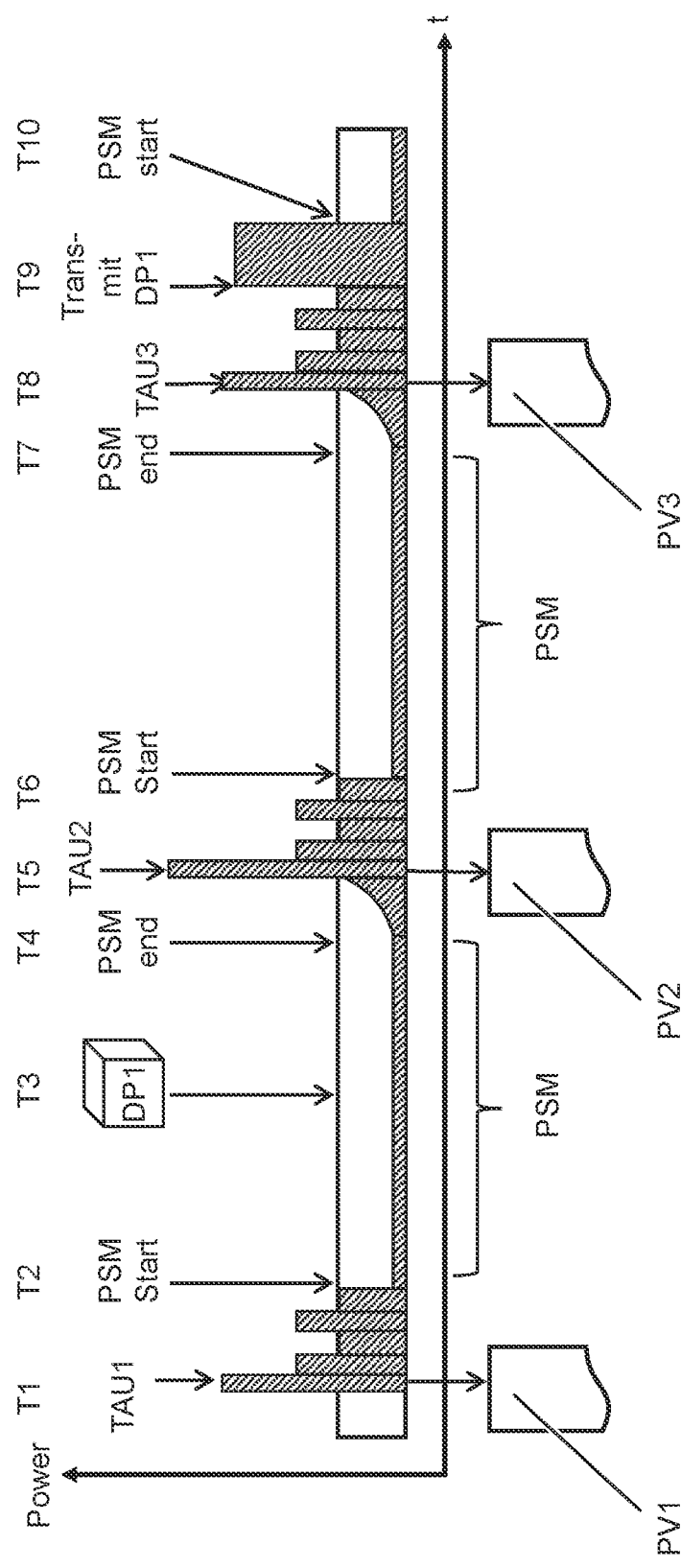
FIG. 3 represents a time and power diagram when applying an exemplifying embodiment of present invention.

In FIG. 3 a time/power diagram shows the impact of applying the exemplifying embodiment of the inventive method on a user equipment.

The time is shown on the horizontal axis, the needed power for single operation in the vertical axis. The time points T1-T10 depict certain events that are described below. The hatched areas below the events indicate the needed TX power for executing the tasks by the exemplifying user equipment. The higher the area, the more power is invested on the same time unit. The square measure of the areas represent the invested total TX power.

The earliest event depicted at timepoint T1 is a first TAU request TAU1 sent by the user equipment 1 to the base station 2. This is the regular operation for TAUs, indicating to the base station 2 after some (predefined) time that the user equipment is still in operation and still camping on the base station 2.

The user equipment measures the TX power needed for carrying out the first TAU request and stores the value as first power value PV1.

After the TAU the user equipment 1 remains for some time in idle mode. This time has according to the 4G standard the duration T3324. In idle mode the user equipments listens to paging after an (e)DRX cycle and thus requires some more power after each DRX cycle for listening to paging in the DL.

At timepoint T2 however the PSM mode is activated. The user equipment 1 is falling in a deep sleep mode, where not even paging messages are listened to. It is visible that during the PSM phase the power consumption is remarkably lower than during idle mode operation. In this time period the module may also shut down its main processor suspend its software and only perform clocking for awaking in time.

At any timepoint T3 a data packet DP1 is made available by the application. That is in particular a measurement result e.g. of current measurements, but any other—in particular regular—message could be meant by this. E.g. also IoT devices may sent regularly to the remote servers messages indicating the current operation status. If something is not operating well, any measures could be taken, e.g. sending a maintenance operator for resolving the issue.

In any case, the data packet is supposed to be sent to the remote server by the user equipment 1, but his is not momentary data, but delay tolerant. That means, it does not have to be transmitted as soon as it is possible, in particular after the PSM phase has ended.

Consequently at timepoint T4 the PSM phase ends, this is according to the standard governed by duration T3412. The first operation the user equipment after waking up is to carry out the next TAU request TAU2 at timepoint T5.

Before sending the TAU the power ramps up, in particular for the RACH procedure preceding each TAU. But then the TAU itself is submitted.

Again the TX power needed for the second TAU TAU2 is determined and stored as second power value PV2.

As it can be seen, the second TAU TAU2 has a higher bar, than the first TAU. Consequently the first power value PV1 is significantly lower than the second power value PV2.

As this difference exceeds the predetermined threshold value, it is consequently decided not to carry out the payload data transmission of the data packet DP1.

Consequently after the TAU only the idle phase is following, without any payload data transmission. At timepoint T6 another PSM phase is started.

When this PSM phase has ended at timepoint T7, then again a TAU, now the third one is carried out.

The TX power needed for the third TAU TAU3 is stored as the third power value PV3. This is again compared to the first power value PV1, which remained the reference power value due to the fact, that after the second TAU a delay was decided, meaning the second power value was found as being too high.

As it can be seen with the hatched bar, the third TAU needed less power than the second TAU. The reasons for that may be widespread. Preferably the path between antenna of the user equipment and the base station is disturbed. This can lead to a worse coverage enhancement situation with more repetitions, that obviously leads to a remarkable increase of TX power for sending the TAU request.

When comparing the third power value PV3 with the first power value PV1, which is the reference power value, it can be seen, that there is almost no difference. Hence it is decided not to delay the payload data transmission.

Consequently in timepoint T9 the transmission of data packet DP1 is carried out. Also for this operation the power is indicated. Should this have been carried out after the second TAU, provided that the radio conditions have not changed since, then the hatched box would have been higher, but most probably take the same time. The square measure difference indicates, how much more time this data packet transmission would have had cost, if the data packet transmission were not delayed.

Alternatively the data packet DP1 could have been submitted directly in conjunction with the TAU, which is foreseen as part of the Early Data Transmission (EDT) concept. This is in particular, but not only, the case when no delay is possible anymore due to that the delay tolerance value is reached. After transmission of the data packet DP1, the user equipment then again activates the PSM mode in timepoint T10. Currently not data packet is waiting. The third power value PV3 now becomes the reference power value for the following TAUs. When the next data packet is supposed to be transmitted then the same procedure is applied.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for data transmission from a user equipment to a remote server by means of a base station of a cellular network, wherein the user equipment is configured to carry out payload data transmission to said remote server, the method comprising the steps of:
  carrying out a first signaling data transmission (TAU1) to the base station,
  determining a first power value representative of the power spent for said first signaling data transmission (TAU1),
  maintaining the first power value (PV1) as reference value,
  carrying out a second signaling data transmission (TAU2) to the base station,
  determining a second power value (PV2) representative of the power spent for said second signaling data transmission (TAU2), and
  when said second power value (PV2) exceeds said reference power value by a predetermined threshold value, delaying the payload data transmission (DP1) for a predetermined time.

2. The method according to claim 1, further comprising, after the step of determining a first power value (PV1), the step of activating a power saving mode at the user equipment, and
  deactivating said power saving mode before the step of carrying out the second signaling data transmission (TAU2).

3. The method according to claim 2, wherein the delay for the payload data transmission (DP1) lasts at least after conducting a third signaling data transmission (TAU3) to the base station.

4. The method according to claim 2,
  wherein the delay lasts shorter than the next power saving mode is activated.

5. The method according to claim 4,
further comprising the step of amending the predetermined threshold value considering at least one out of the group:
carrying out said payload data transmission (DP1),
delaying said payload data transmission (DP1).

6. The method according to claim 5, further comprising the step of amending the reference value considering at least two determined power values indicative of the power spend for said signaling data transmission.

7. The method according to claim 4, wherein the user equipment is further maintaining a maximum delay tolerance value, wherein the method comprises the step of carrying out the payload data transmission (DP1) in case the expired delay exceeds the maximum delay tolerance value.

8. The method according to claim 7,
further comprising the step of amending at least one out of the group of:
the delay tolerance value,
the predetermined threshold value, and
power saving mode duration,
when the payload data transmission (DP1) is carried out due to exceeding the maximum delay tolerance.

9. A user equipment for data transmission to a remote server by means of a base station of a cellular network, wherein the user equipment is configured to regularly carrying out payload data transmission (DP1) to said remote server, further configured to:
carry out a first signaling data transmission (TAU1) to the base station,
determine a first power value (PV1) representative of the power spent for said first signaling data transmission (TAU1),
maintaining the first power value (PV1) as reference power value,
carry out a second signaling data transmission (TAU2) to the base station,
determine a second power value (PV2) representative of the power spent for said second signaling data transmission (TAU2),
when said second power value (PV2) exceeds said reference power value by a predetermined threshold value, delay the payload data transmission (DP1) for a predetermined time.

10. The user equipment according to claim 9, further configured to:
activate, after the step of determining a first power value (PV1), a power saving mode at the user equipment, and
deactivate said power saving mode before the step of carrying out the second signaling data transmission (TAU2).

11. The user equipment according to claim 9, further configured that the delay for the payload data transmission (DP1) lasts at least after conducting a third signaling data transmission (TAU3) to the base station.

12. The user equipment according to claim 11,
further configured to amend the predetermined threshold value considering at least one out of the group:
carrying out said payload data transmission (DP1),
delaying said payload data transmission (DP1).

13. The user equipment according to claim 12,
further configured to amend the reference power value considering at least two determined values indicative of the power spend for said signalling data transmission.

14. The user equipment according to claim 13, further configured to maintain a maximum delay tolerance value, and to carry out the payload data transmission (DP1) in case the expired delay exceeds the maximum delay tolerance value.

15. The user equipment according to claim 14,
further configured to amend at least one out of the group of:
the delay tolerance value,
the predetermined threshold value, and
power saving mode duration,
when the payload data transmission (DP1) is carried out due to exceeding the maximum delay tolerance.

\* \* \* \* \*